United States Patent [19]

Rai

[11] 4,325,071
[45] Apr. 13, 1982

[54] THERMAL RECORDING STYLUS

[75] Inventor: Raghuvir Rai, Los Angeles, Calif.

[73] Assignee: Telautograph Corporation, Los Angeles, Calif.

[21] Appl. No.: 187,193

[22] Filed: Sep. 15, 1980

[51] Int. Cl.³ .................... G01D 15/16; G01D 15/10
[52] U.S. Cl. ............................. 346/139 C; 346/76 R
[58] Field of Search .................. 346/139 C, 76 R; 219/216

[56] References Cited

U.S. PATENT DOCUMENTS

| | | | |
|---|---|---|---|
| 2,474,312 | 6/1949 | Halpern | 346/139 C |
| 4,016,572 | 4/1977 | Hubbard | 346/139 C |
| 4,292,641 | 9/1981 | Grassmann | 346/76 R |

FOREIGN PATENT DOCUMENTS

| | | | |
|---|---|---|---|
| 1114661 | 5/1968 | United Kingdom | 346/139 C |
| 453572 | 5/1975 | U.S.S.R. | 346/139 C |

*Primary Examiner*—George H. Miller, Jr.
*Attorney, Agent, or Firm*—Freilich, Hornbaker, Wasserman, Rosen & Fernandez

[57] ABSTRACT

A thermal recording stylus comprised of a ceramic tip with two passages from openings near a frustum-shaped end to openings at the rear, an electrical heating element wrapped around the frustum-shaped end from one opening thereof to the other, and electrical power leads extending from the ends of the heating element through the passages. The leads and heating element are secured with cement in the passages, and the entire assembly is secured in a sleeve with cement and a ring wedged between a conical section of the ceramic tip and the sleeve.

4 Claims, 4 Drawing Figures

THERMAL RECORDING STYLUS

BACKGROUND OF THE INVENTION

This invention relates to a thermal recording stylus, and more particularly to an improved nib for a thermal recording stylus.

Thermal recording on heat sensitive paper has been in use in Telautograph systems for many years. These systems are designed to transmit graphic information, written or drawn by an operator, or otherwise produced by a machine, at a transmitter, and to accurately reproduce the graphic information on heat sensitive paper at a receiver. An advantage of thermal recording over ink recording is that an unattended receiver may be used with much greater confidence that the stylus is functional.

Receivers that use an ink stylus, such as a ball-point pen, suffer from many problems related to just the stylus. First there is the problem of running out of ink. Then there is the problem of the ink drying at the nib, thus clogging the free flow of ink, and in the case of ball-point pens, causing the ball to stick or otherwise "skip," particularly when used infrequently.

This is not to say that thermal recording does not have its own problems. However, such problems may be readily solved. For example, there is a problem of fast start-up, but that problem can be solved by proper design of the nib. An excellent solution disclosed in U.S. Pat. No. 4,027,311 is forming a narrow strip of resistive metal into a nib over the tip of a ceramic stylus, and applying sufficient electrical current through the strip to heat the nib to the desired temperature.

Although this resistive metal nib over a ceramic stylus has been used very successfully, there is the problem of wear on the nib. The thermal paper, like most paper, is abrasive, so it tends to grind the nib material away. This decreases the cross-sectional area of the strip at the nib, thereby increasing resistivity and consequently increasing the temperature of the nib. However, this is not a critical problem since very good thermal recording is possible over a wide temperature range. The more critical problem is the nib wearing completely through and breaking open, in which case current flow is interrupted and recording stops.

SUMMARY OF THE INVENTION

An object of this invention is to overcome this wear problem in the thermal recording stylus disclosed in the aforesaid patent, and to provide a stylus that will record with a more consistent line width over a long period of time.

These and other objects of the invention may be achieved by forming a ceramic tip with two passages from openings near a frustum-shaped end thereof to openings at the rear end, wrapping an electrical heating element around from one opening to the other, and passing electrical power leads to the ends of the heating element through the passages. The ceramic stylus and heating element are inserted into a sleeve used for securing the stylus to a recording instrument. The sleeve may extend to very near the end of the tip for protection of the stylus, and to reduce heat loss by convection. A sealing cement is used to secure the heating element and leads in the passages, and to secure the stylus to the sleeve. The ends of the leads protrude from the sleeve at the rear for connection to a source of electrical power.

The novel features that are considered characteristic of this invention are set forth with particularity in the appended claims. The invention will best be understood from the following description when read in connection with the accompanying drawings.

Figure 1:
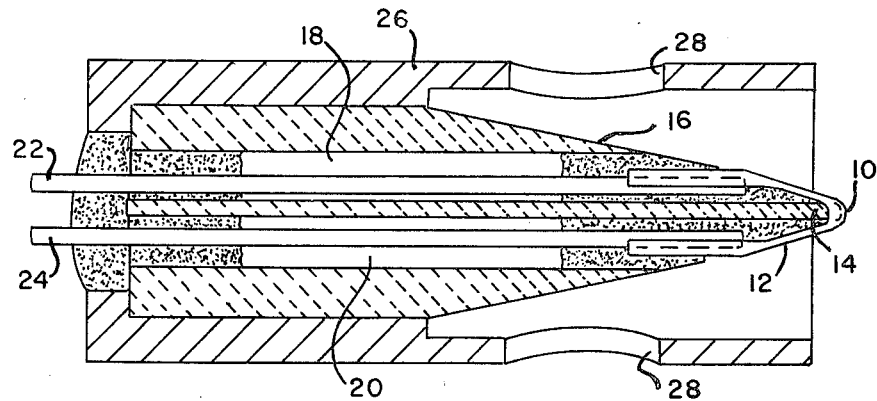
FIG. 1 is a sectional view of a prior-art thermal stylus made in accordance with the teachings of the aforesaid patent.

Reference will now be made in detail to a preferred embodiment of the invention, an example of which is illustrated in the drawings.

DESCRIPTION OF PREFERRED EMBODIMENTS

Referring now to the prior-art thermal stylus shown in FIG. 1, a nib 10 is formed in a strip 12 of resistive material to fit closely over the conical tip 14 of a ceramic core 16 having two passages 18, 20 on opposite sides of the core axis.

Electrical power leads 22, 24 connected to the ends of the conductive strip 12 pass through these passages. These passages are filled from each end with a suitable sealing cement to hold the strip 12 with its nib 10 against the tip 14 of the core 16, and to hold the leads 22, 24 in place.

The entire assembly is inserted into a sleeve 26, and secured with a suitable sealing cement packed in close around the leads 22, 24. The cement should be of non-conductive material which will withstand the heat to be expected from the strip 12, such as a thermal setting epoxy, or any of the materials used for potting electrical components that are subject to generation of significant heat. A commercially available cement sold under the trade name Savereison has been found to be suitable.

The sleeve extends to very near the tip of the stylus core to protect the tip and to reduce heat loss at the tip by convection. However, it has been found desirable to provide some cooling of the ceramic core where the leads connect to the heating element. This is accomplished by vent holes 28 in the sleeve.

The problem with this otherwise successful stylus is that the heated nib 10 rides directly on the thermal paper, and is therefore subject to significant wear. Once the nib has worn down significantly, it tends to heat to a higher temperature. That in itself could be tolerated, but eventually the strip 12 becomes so thin at the nib 10 that it breaks. Once that occurs, all thermal recording stops until the stylus is replaced.

Figure 2:
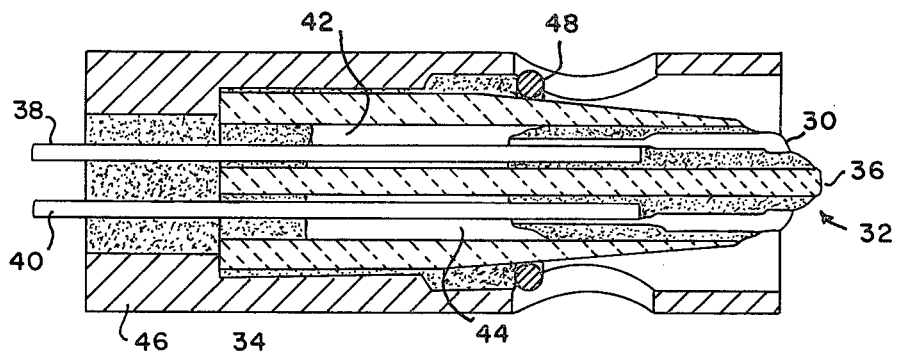
FIG. 2 is a sectional view of an improved thermal stylus made in accordance with the present invention.
Figure 3:
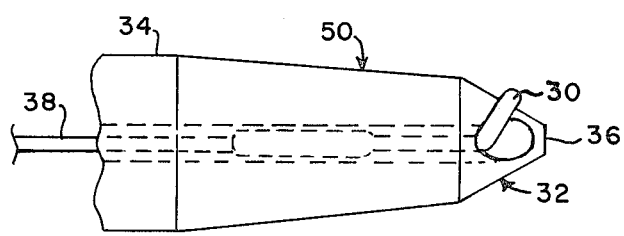
FIG. 3 is a view in elevation of the ceramic tip and heating element of the stylus in FIG. 2.
Figure 4:
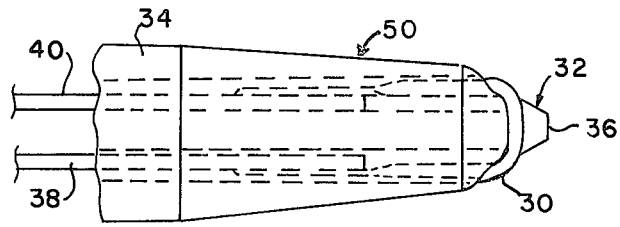
FIG. 4 is a view of the ceramic tip and heating element shown in FIG. 3.

To overcome that problem, the stylus has been significantly changed to avoid any wear on the heating element. That has been accomplished, as shown in FIG. 2, by utilizing a heating element 30 formed out of resistive material (NiCoFe) to fit closely around a tip 32 of a ceramic ($Al_2O_3$) core 34. The tip 32 is formed with the shape of a frustum, as may be better seen in FIG. 3, to leave a flat face 36 of a diameter that is the width of the line to be recorded on thermal paper.

The heating element is connected to copper leads 38, 40 before the leads are inserted through passages 42, 44 in the core 34 as before, and the ends of the passages are closed with a sealing cement before the core 34 is inserted into a stainless steel sleeve 46. A sealing cement is then used to close the end of the sleeve remote from the stylus tip, and also to seal around the core in the sleeve behind a retaining ring 48 wedged between the sleeve and a conical section 50 of the core.

The ring 48 is forced into the sleeve 46 not only to hold the core 34 in the sleeve 46 while the cement is curing, but also to assure that the axis of the core 34 is aligned with the axis of the sleeve 46. This alignment is not critical, but it is important to the extent that the sleeve is used to mount the stylus in a recording arm with its axis normal to the thermal recording surface. So it is important to then be assured that the axis of the core 34 is also normal to the recording surface so that the face 36 of the tip 32 is flat against the recording surface.

In operation, the heating element 32 is heated by electrical power applied through leads 38, 40. The heated element in turn heats the tip 32 of the core 34. Since the tip is made of ceramic material, like the rest of the core, it will resist wear much better than the material of the heating element used to form the nib in the prior-art stylus of FIG. 1. Any wear which does result from long use would not destroy the heating element. It would simply increase the diameter of the face 36 of the tip very slightly, thereby imperceptibly increasing the width of the line recorded. To avoid even that, it would be possible to shape the tip to have a cylindrical section over at least that portion that protrudes past the heating element. Still other variations and modifications may occur to those skilled in this art, particularly in the selection of materials. Consequently, it is intended that the claims be interpreted to cover such modifications and equivalents.

What is claimed is:

1. A thermal recording stylus comprised of a ceramic tip with a frustum-shaped end, and an electrical heating element wrapped around said frustum-shaped end over a substantial part of the curved surface thereof to heat said tip for the purpose of thermal recording with the flat surface thereof, and electrical leads for applying electrical power to said element.

2. A thermal recording stylus as defined by claim 1 wherein said ceramic tip is provided with two passages from openings near the frustum shaped end to openings at the end opposite said frustum shaped end, and said electrical leads pass through said passages.

3. A thermal recording stylus as defined by claim 1 or 2 including a sleeve surrounding said ceramic tip from the end opposite said frustum-shaped end to near the flat surface of said frustum-shaped end.

4. A thermal recording stylus as defined in claim 3 wherein said shield is cylindrical, and wherein a section of said ceramic tip between said frustum-shaped end and the opposite end is conical, and including a ring wedged between said conical section and said sleeve to align the axis of said frustum-shaped tip with the axis of said sleeve, whereby said thermal recording stylus may be mounted in a recording arm with assurance of aligning the flat end of said ceramic tip against a recording surface.

* * * * *